United States Patent
Kimoto et al.

(10) Patent No.: US 11,451,102 B2
(45) Date of Patent: Sep. 20, 2022

(54) ROTARY ELECTRIC MACHINE

(71) Applicant: MITSUBISHI ELECTRIC CORPORATION, Chiyoda-ku (JP)

(72) Inventors: Yusuke Kimoto, Chiyoda-ku (JP);
Junji Kitao, Chiyoda-ku (JP);
Tomohira Takahashi, Chiyoda-ku (JP);
Yoshihiro Miyama, Chiyoda-ku (JP);
Junichi Nakazono, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 105 days.

(21) Appl. No.: 16/635,868

(22) PCT Filed: Feb. 28, 2018

(86) PCT No.: PCT/JP2018/007568
§ 371 (c)(1),
(2) Date: Jan. 31, 2020

(87) PCT Pub. No.: WO2019/049394
PCT Pub. Date: Mar. 14, 2019

(65) Prior Publication Data
US 2020/0274411 A1    Aug. 27, 2020

(30) Foreign Application Priority Data

Sep. 6, 2017    (JP) .............................. JP2017-170960

(51) Int. Cl.
*H02K 1/32*    (2006.01)
*H02K 1/27*    (2022.01)
(Continued)

(52) U.S. Cl.
CPC ............... *H02K 1/32* (2013.01); *H02K 1/276* (2013.01); *H02K 9/193* (2013.01)

(58) Field of Classification Search
CPC ............ H02K 1/32; H02K 9/19; H02K 9/193; H02K 1/276; H02K 1/2766; H02K 5/20
(Continued)

(56) References Cited

U.S. PATENT DOCUMENTS

2010/0194220 A1*  8/2010  Tatematsu ............ H02K 1/2766
                                                                     310/61
2019/0181708 A1*  6/2019  Maekawa ............... H02K 1/276

FOREIGN PATENT DOCUMENTS

JP        2009-72044 A      4/2009
JP        2009-232557 A     10/2009
(Continued)

OTHER PUBLICATIONS

JP-2012105487-A (English Translation) (Year: 2012).*
(Continued)

*Primary Examiner* — Quyen P Leung
*Assistant Examiner* — Alexander Moraza
(74) *Attorney, Agent, or Firm* — Xsensus LLP

(57) ABSTRACT

A rotary electric machine including a rotor including a rotor core; permanent magnets to be embedded in the rotor core; and a one end-side end plate configured to support one end side of the rotor core. The rotor core has rotor refrigerant passages through which refrigerant for cooling the permanent magnets flows in an axial direction of the shaft. The one end-side end plate has an end plate refrigerant passage communicating with the rotor refrigerant passages. The end plate refrigerant passage has refrigerant reservoirs, each projecting to an outer side in a radial direction of the shaft.

7 Claims, 12 Drawing Sheets

(51) Int. Cl.
*H02K 9/193* (2006.01)
*H02K 1/276* (2022.01)

(58) Field of Classification Search
USPC ..... 310/216.119, 52, 54, 58, 59, 60 A, 60 R,
310/61–63, 156.53, 156.56
See application file for complete search history.

(56) References Cited

FOREIGN PATENT DOCUMENTS

| | | | | | |
|---|---|---|---|---|---|
| JP | 2009232557 | A | * | 10/2009 | |
| JP | 2010239799 | A | * | 10/2010 | ............... H02K 9/19 |
| JP | 2012105487 | A | * | 5/2012 | |
| JP | 2012-178939 | A | | 9/2012 | |
| JP | 2012-235546 | A | | 11/2012 | |
| JP | 2013-115848 | A | | 6/2013 | |
| WO | WO 2012/117672 | A1 | | 9/2012 | |

OTHER PUBLICATIONS

JP-2009232557-A (English Translation) (Year: 2009).*
JP-2010239799-A (English Translation) (Year: 2010).*
International Search Report dated May 29, 2018 in PCT/JP2018/007568 filed Feb. 28, 2018, 1 page.

* cited by examiner

ROTARY ELECTRIC MACHINE

CROSS-REFERENCE TO RELATED APPLICATIONS

This application is a United States national stage application of International Application No. PCT/JP2018/007568, filed Feb. 28, 2018, which designates the United States and claims priority to Japan Patent Application No. 2017-170960, filed Sep. 6, 2017, and the entire contents of each of the above applications are hereby incorporated herein by reference in entirety.

TECHNICAL FIELD

The present invention relates to a rotary electric machine including permanent magnets provided in a rotor.

BACKGROUND ART

In a rotary electric machine including permanent magnets embedded in a rotor, performance is lowered due to heat along with increase in output and downsizing. In particular, when a temperature of the permanent magnets rises, a phenomenon that a magnetic coercive force of the permanent magnets is reduced, specifically, demagnetization occurs. As a result, the performance of the rotary electric machine greatly deteriorates. Thus, a technology of forming refrigerant passages through which refrigerant passes in the rotor so as to cool the permanent magnets with use of the refrigerant has been developed (see, for example, Patent Literature 1).

In a related-art rotary electric machine described in Patent Literature 1, a shaft center refrigerant passage and shaft radial refrigerant passages are formed in a shaft of a rotor. The shaft center refrigerant passage extends in an axial direction of the shaft. The shaft radial refrigerant passages extend in a radial direction of the shaft. Further, the related-art rotary electric machine has an end plate refrigerant passage, which is formed between an end face of a rotor core being a rotor main body and an end plate configured to support the rotor core so as to communicate with the shaft radial refrigerant passages. Further, in the related-art rotary electric machine, rotor refrigerant passages, which communicate with the end plate refrigerant passage and extend to a respective plurality of permanent magnets embedded in the rotor core, are formed. With the structure described above, the refrigerant flows through the rotor refrigerant passages via the two kinds of refrigerant passages in the shaft and the end plate refrigerant passage, to thereby cool the permanent magnets.

CITATION LIST

Patent Literature

[PTL 1] JP 2012-235546 A

SUMMARY OF INVENTION

Technical Problem

However, the related art has the following problem.
In the rotary electric machine described in Patent Literature 1, the refrigerant for cooling the permanent magnets is introduced into the shaft center refrigerant passage, is caused to pass through the shaft radial refrigerant passages to be supplied to the end plate refrigerant passage, and is supplied to the rotor refrigerant passages formed to extend toward the plurality of magnets, respectively. A centrifugal force acts on the refrigerant supplied to the end plate refrigerant passage due to rotation of the rotor. Thus, the refrigerant is pressed against an outer face of the end plate refrigerant passage in the radial direction of the shaft. Further, in many cases, the rotary electric machine is installed so that the shaft lies horizontally. In this case, gravity acts on the refrigerant. Thus, a sufficient amount of refrigerant cannot be accumulated in an upper part of the outer face of the end plate refrigerant passage in the radial direction of the shaft as compared to a lower part thereof. Thus, the related-art rotary electric machine has a problem in that the amount of refrigerant to be supplied from the end plate refrigerant passage to the rotor refrigerant passages becomes uneven.

The present invention has been made to solve the problem described above, and has an object to provide a rotary electric machine capable of evenly cooling permanent magnets of a rotor.

Solution to Problem

According to one embodiment of the present invention, there is provided an rotary electric machine including a rotor including: a rotor core; permanent magnets to be embedded in the rotor core; and a one end-side end plate configured to support one end side of the rotor core. The rotor core has rotor refrigerant passages through which refrigerant for cooling the permanent magnets flows in an axial direction of the shaft. The one end-side end plate has an end plate refrigerant passage communicating with the rotor refrigerant passages. The end plate refrigerant passage has refrigerant reservoirs, each projecting to an outer side in a radial direction of the shaft.

Advantageous Effects of Invention

With the rotary electric machine according to one embodiment of the present invention, the refrigerant in the end plate refrigerant passage is pressed against an outer face of the end plate refrigerant passage in the radial direction of the shaft by a centrifugal force. In the end plate refrigerant passage, the refrigerant reservoirs, which project to the outer side in the radial direction of the shaft with respect to other portion of the outer face of the end plate refrigerant passage in the radial direction of the shaft, are formed on the outer face of the end plate refrigerant passage in the radial direction of the shaft. When gravity acts, a sufficient amount of refrigerant is accumulated in the refrigerant reservoirs even in an upper part of the end plate refrigerant passage. Thus, the refrigerant is stably supplied evenly to the plurality of rotor refrigerant passages from the end plate refrigerant passage.

Thus, the rotary electric machine capable of evenly cooling the permanent magnets of the rotor can be provided.

DESCRIPTION OF EMBODIMENTS

Now, embodiments of a rotary electric machine according to the present invention is described with reference to the drawings. Note that, the same or corresponding portions are denoted by the same reference symbols, and the overlapping description thereof is omitted.

First Embodiment

Figure 1:
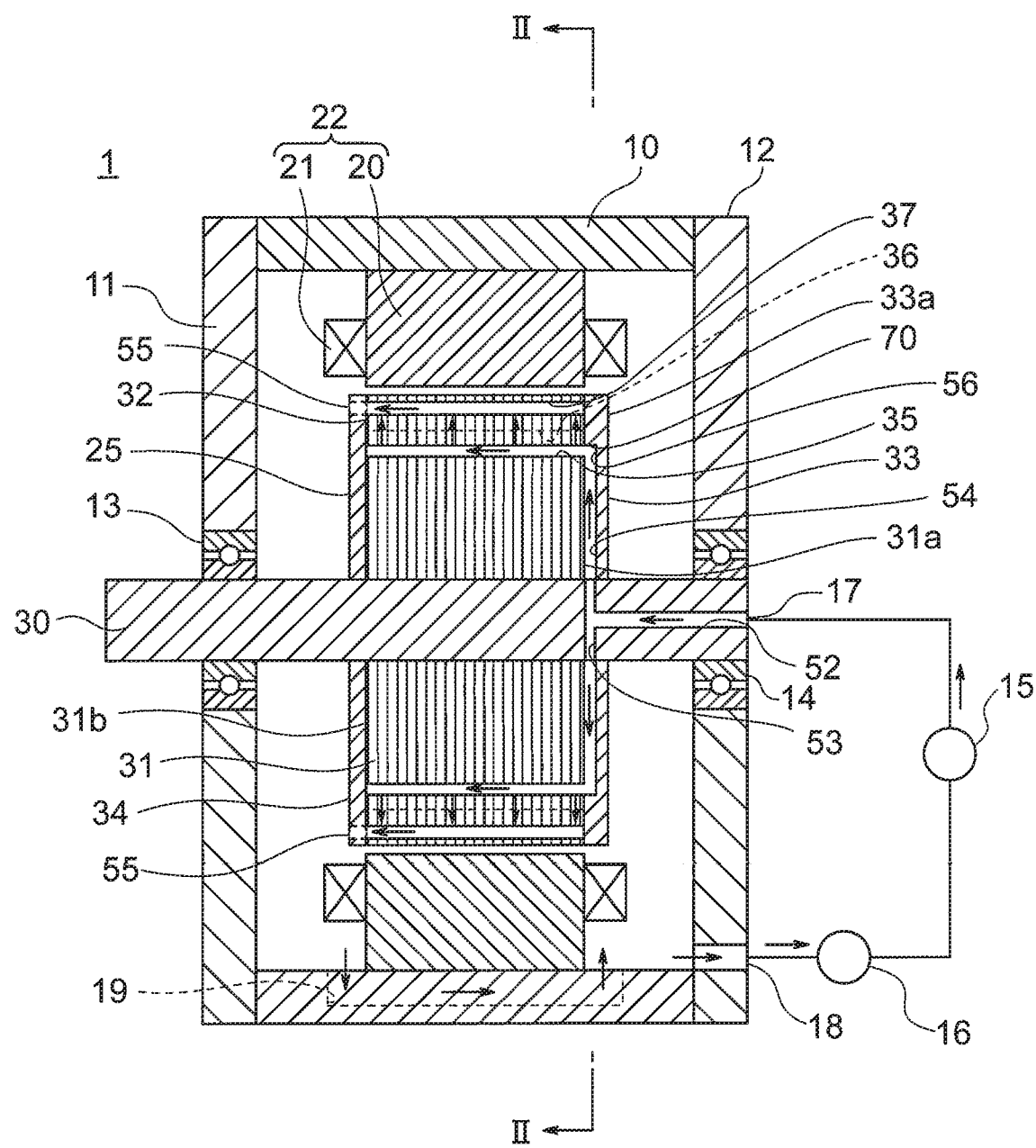
FIG. 1 is a schematic sectional view of a rotary electric machine according to a first embodiment of the present invention, which is taken along an axial direction of a shaft.

FIG. 1 is a schematic sectional view of a rotary electric machine according to a first embodiment of the present invention, which is taken along an axial direction of a shaft.

A basic configuration of the rotary electric machine according to the first embodiment is described with reference to FIG. 1.

A rotary electric machine 1 includes a housing 10 having a cylindrical shape, an output-side bracket 11 having a disc shape, and a non-output-side bracket 12 having a disc shape, which are combined with each other. Each of the housing 10, the output side bracket 11, and the non-output-side bracket 12 is made of a metal. However, each of the above-mentioned members may be formed of a resin. In a center of the housing 10, the output-side bracket 11, and the non-output-side bracket 12, a shaft 30 having a cylindrical shape, which is made of a metal, is provided. The shaft 30 projects from the output-side bracket 11. On the output-side bracket 11 side, an output of the rotary electric machine 1 is obtained. In the rotary electric machine 1, built-in portions and members are covered with the housing 10, the output-side bracket 11, and the non-output-side bracket 12 so as to be accommodated and protected.

The shaft 30 is rotatably supported by an output-side bearing 13 in the output-side bracket 11. Further, the shaft 30 is rotatably supported by a non-output-side bearing 14 in the non-output-side bracket 12. Each of the output-side bearing 13 and the non-output-side bearing 14 is made of a metal and has a doughnut-like shape. The output-side bearing 13 and the non-output-side bearing 14 allow precise and smooth rotation of the shaft 30.

Inside the housing 10, a rotor 25 having a cylindrical shape is fixed to a radially outer side of the shaft 30. The rotor 25 is rotated integrally with the shaft 30 with the shaft 30 serving as a rotary shaft. The rotor 25 includes a rotor core 31, a plurality of permanent magnets 32, a non-output-side end plate 33, and an output-side end plate 34. The rotor core 31 has a cylindrical shape, and is formed by laminating thin steel plates in an axial direction of the shaft 30. The thin steel plates have excellent magnetic characteristics, specifically, a high magnetic permeability and a small iron loss. The rotor core 31 has a non-output-side end face 31a on a non-output side and an output-side end face 31b on an output side. The non-output-side end plate 33 is provided on the non-output-side end face 31a side, and the output-side end plate 34 is provided on the output-side end face 31b side. The non-output-side end plate 33 and the output-side end plate 34 sandwich the rotor core 31 to fix the rotor core 31. Each of the non-output-side end plate 33 and the output-side end plate 34 has a disc shape and is made of a metal. However, the end plates 33 and 34 may be formed of a resin. The non-output-side end plate 33 has a flange 33a on an outer side in a radial direction of the shaft 30, and has a recess on an inner side of the flange 33a. The non-output-side end plate 33 corresponds to a one end-side end plate, and the output-side end plate 34 corresponds to another end-side end plate.

The permanent magnets 32 are embedded in the rotor core 31. Each of the permanent magnets 32 is a cuboid, and is formed of alnico, ferrite, or neodymium. The rotor core 31 has radially inner-side flux barriers 36 formed on an inner side of the permanent magnets 32 in the radial direction of the shaft 30. Further, the rotor core 31 has radially outer-side flux barriers 37 formed on an outer side of the permanent magnets 32 in the radial direction of the shaft 30. Each of the radially inner-side flux barriers 36 and the radially outer-side flux barriers 37 is a hole having a semi-cylindrical shape, which passes through the rotor core 31 in the axial direction of the shaft 30. The radially inner-side flux barriers 36 and the radially outer-side flux barriers 37 ease a stress applied to the permanent magnets 32 by rotation of the rotor 25 and suppress breakage of the rotor 25. Further, the rotor core 31 has rotor core cooling holes 35 formed on the inner side of the permanent magnets 32 in the radial direction of the shaft 30. Each of the rotor core cooling holes 35 is a hole having a semi-cylindrical shape, which passes through the rotor core 31 in the axial direction of the shaft 30. The rotor core cooling holes 35 correspond to rotor refrigerant passages.

A stator 22 having a cylindrical shape is provided on the outer side in the radial direction of the shaft. 30 so as to be opposed to the rotor 25. The stator 22 includes a stator core 20 and a coil 21. The stator core 20 is formed by laminating thin steel plates having excellent magnetic characteristics in the axial direction of the shaft 30. The stator core 20 is fixed to an inner face of the housing 10. The stator core 20 is formed in a u-like shape when viewed in the axial direction of the shaft 30. The stator core 20 may be formed in a T-like shape. The coil 21 is formed by winding a conductive wire around tooth portions corresponding to leg portions of the u-like shape of the stator core 20 about a radial direction of the shaft 30 as an axis. The wound conductive wire is made of copper having a high electrical conductivity, and has a circular sectional shape. However, the conductive wire may have a rectangular shape.

Next, configurations of members and portions, which are associated with flow of refrigerant for cooling the permanent magnets, are described with reference to FIG. 1 and FIG. 2.

As illustrated in FIG. 1, a shaft center refrigerant passage 5r is formed in the center of the shaft 30 along the axial direction of the shaft 30 so as not to completely pass through the shaft 30. The shaft center refrigerant passage 52 is a hole having a circular cross section. A non-output side of the shaft center refrigerant passage 52 is open, and a refrigerant supply portion 17 is formed on the non-output side. Shaft radial refrigerant passages 53 are formed in the radial direction of the shaft 30 so as to communicate with the shaft center refrigerant passage 52. The shaft radial refrigerant passages 53 are through holes formed radially from the center of the shaft 30.

The non-output-side end plate 33 has the flange 33a on the outer side in the radial direction of the shaft 30. With the fixation of the non-output-side end plate 33 to the non-output-side end face 31a of the rotor core 31, a non-output-side refrigerant passage 54, which is a hollow region having a cylindrical shape, is formed in the non-output-side end plate 33. The flange 33a has a wall face 70 on the inner side in the radial direction of the shaft 30. The non-output-side refrigerant passage 54 is a region in the non-output-side end plate 33, which is surrounded by the wall face 70. The non-output-side refrigerant passage 54 communicates with the shaft radial refrigerant passages 53. The non-output-side refrigerant passage 54 forms an end plate refrigerant passage.

Refrigerant reservoirs 56 are formed in the non-output-side refrigerant passage 54 so as to be located in the vicinity of the wall face 70 of the non-output-side end plate 33. Each of the refrigerant reservoirs 56 is a portion of the non-output-side refrigerant passage 54, which projects to the outer side in the radial direction of the shaft 30. The non-output-side refrigerant passage 54 communicates with the rotor core cooling holes 35 through the refrigerant reservoirs 56. The rotor core cooling holes 35 communicate with the radially inner-side flux barriers 36. Further, the rotor core cooling holes 35 communicate with the radially outer-side flux barriers 37 through holes into which the permanent magnets 32 are inserted. The radially outer-side flux barriers 37 communicate with refrigerant discharge holes 55, which are opening portions formed in the output-side end plate 34.

A refrigerant passage 19 is formed in a lower part of the housing 10. The refrigerant passage 19 is a groove through which the refrigerant passes from the output side to the non-output side. In a lower part of the non-output-side bracket 12, a refrigerant discharge portion 18 is formed. The refrigerant discharge portion 18 is a though hole through which the refrigerant passes. The refrigerant discharge portion 18 is connected to an oil cooler 16. The oil cooler 16 is connected to a pump 15. The pump 15 is connected to the refrigerant supply portion 17.

Figure 2:
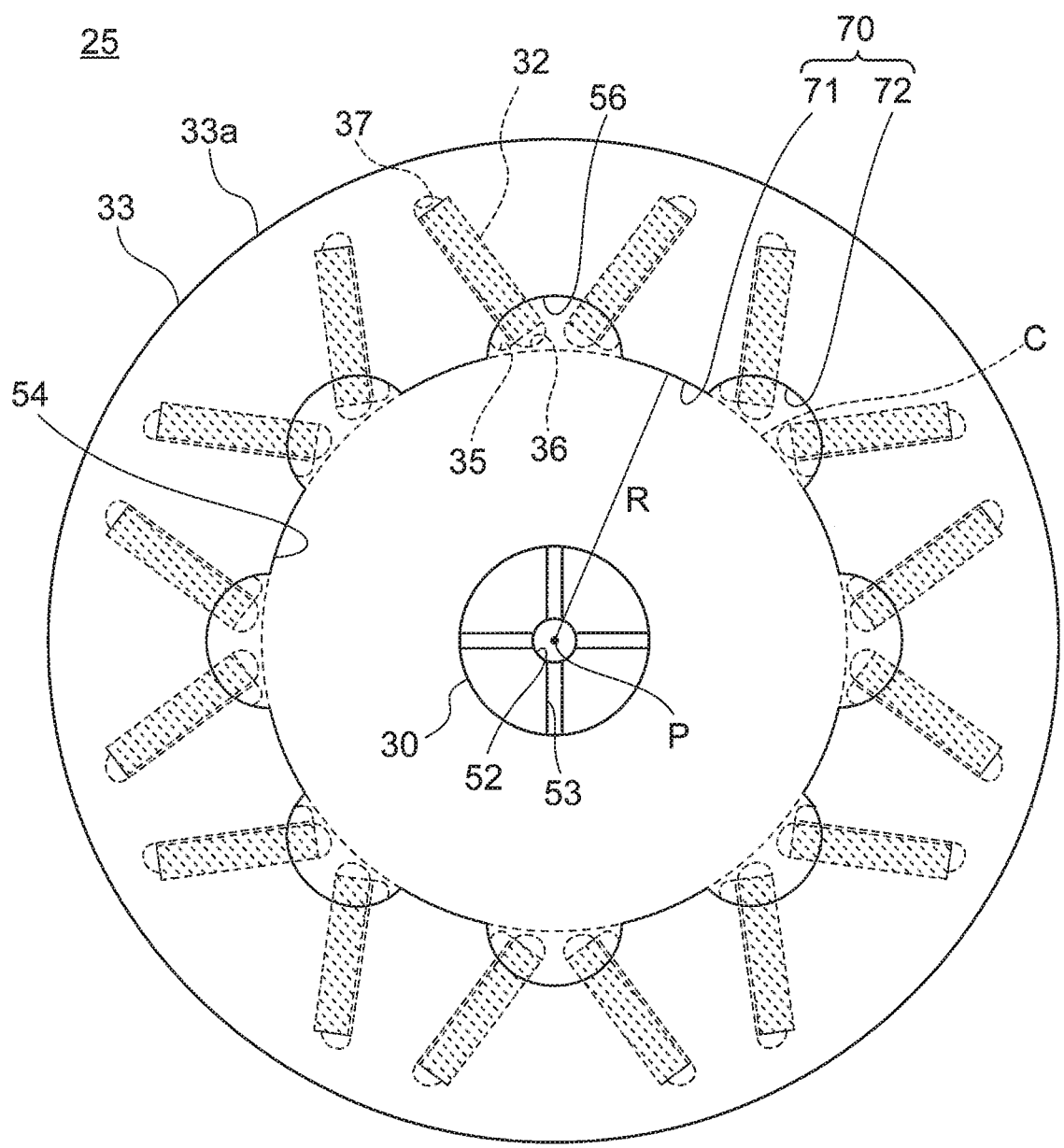
FIG. 2 is a view of a rotor when viewed from the line II-II in FIG. 1.
Figure 3:
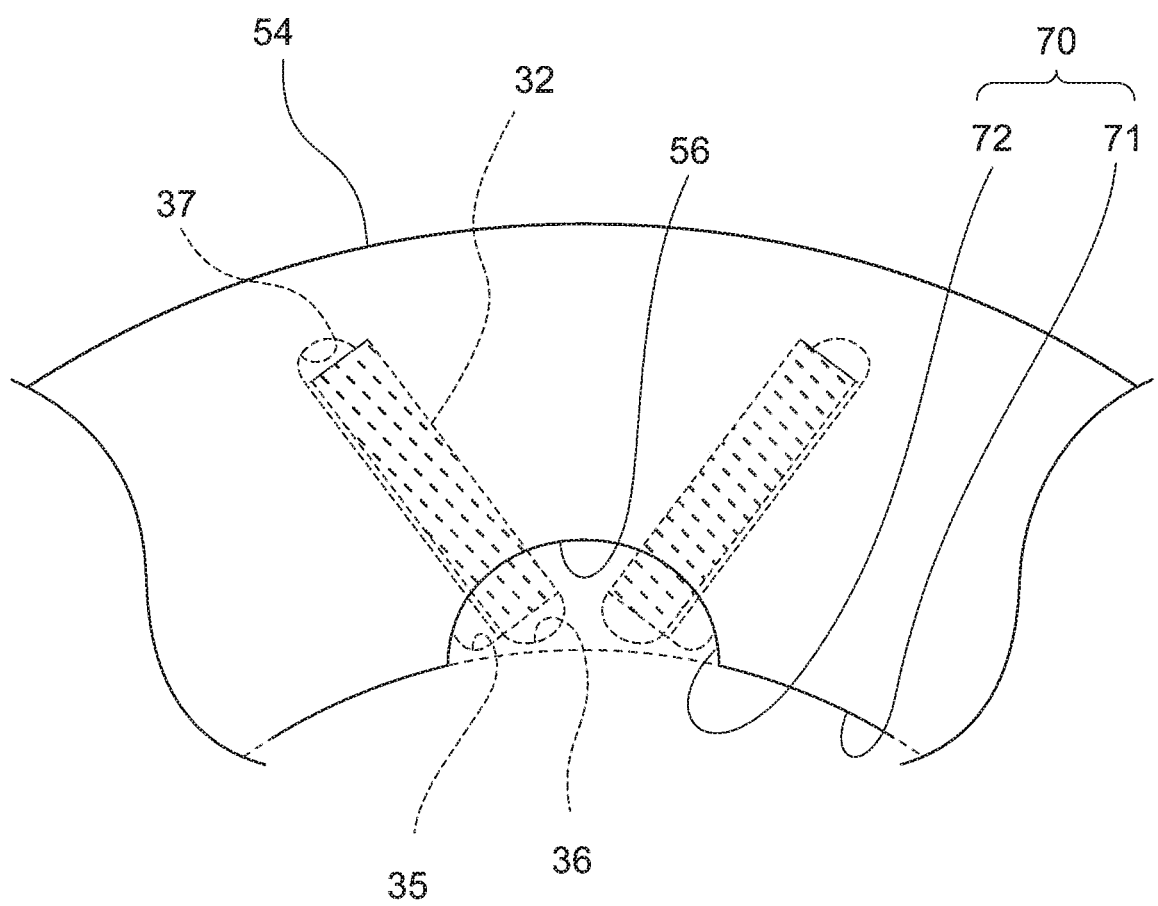
FIG. 3 is an enlarged view of refrigerant reservoirs of FIG. 2.

FIG. 2 is a view of the rotor when viewed from the line II-II in FIG. 1. FIG. 3 is an enlarged view of the refrigerant reservoir of FIG. 2.

Four shaft radial refrigerant passages 53 are formed radially from a center axis P of the shaft 30. The non-output-side refrigerant passage 54 is formed on the outer side in the radial direction of the shaft 30 over the entire periphery of the shaft 30 in a circumferential direction thereof.

The non-output-side refrigerant passage 54 has the wall face 70 on the outer side in the radial direction of the shaft 30. The wall face 70 has arc wall faces 71 and projecting-portion wall faces 72, which are formed alternately along the circumferential direction of the shaft 30. Each of the arc wall faces 71 is an arc face formed on a circle C, which has a length R as a radius and the center axis P of the shaft 30 as a center. Each of the projecting-portion wall faces 72 is a semi-circular curved face projecting from the arc wall faces 71 to the outer side in the radial direction of the shaft 30. A portion on the inner side of the projecting-portion wall face 72 in the radial direction of the shaft 30 is the refrigerant reservoir 56. Specifically, the refrigerant reservoir 56 is a projecting portion of the non-output-side refrigerant passage 54, which projects to the outer side in the radial direction of the shaft 30. The refrigerant reservoir 56 has a semi-circular shape. The shape of the refrigerant reservoir 56 may be other shapes such as a rectangular. The rotor core cooling holes 35 communicate with the non-output-side refrigerant passage 54 through the refrigerant reservoirs 56. The permanent magnets 32 are provided so that one permanent magnet 32 and the permanent magnet 32 adjacent thereto are arranged in a V-like pattern, which is open to the outer side in the radial direction of the shaft 30.

Next, an action of the rotary electric machine 1 according to the first embodiment is described together with a circulation flow of the refrigerant in the rotary electric machine 1 according to the first embodiment with reference to FIG. 1 to FIG. 3.

As indicated by the arrows in FIG. 1, the refrigerant for cooling the permanent magnets 32 is supplied from the pump 15 to the refrigerant supply portion 17. The refrigerant flows into the shaft 30 from the refrigerant supply portion 17 and passes through the shaft center refrigerant passage 52 and the shaft radial refrigerant passages 53 to be supplied to the non-output-side refrigerant passage 54. In this case, a flow passage sectional area of the shaft center refrigerant passage 52 is larger than a flow passage sectional area of each of the shaft radial refrigerant passages 53. With the sectional areas described above, a sufficient amount of refrigerant can be supplied to each of the plurality of shaft radial refrigerant passages 53 from the shaft center refrigerant passage 52.

As illustrated in FIG. 2, the wall face 70 of the non-output-side refrigerant passage 54 has a gear shape with repetition of the arc wall faces 71, each having an arc shape, and the projecting-portion wall faces 72, each projecting from the arc wall faces 71 to the outer side in the radial direction of the shaft 30. The refrigerant supplied to the non-output-side refrigerant passage 54 is subjected to a centrifugal force and an inertia force, which are generated by the rotation of the rot 25. The refrigerant flows through the non-output-side refrigerant passage 54 in the circumferential direction of the shaft 30 while being pressed toward the outer side in the radial direction of the shaft 30. Thus, the refrigerant is more likely to be concentrated in the vicinity of the projecting-portion wall faces 72 than in the vicinity of the arc wall faces 71. Specifically, when the rotor 25 is rotated, the refrigerant is accumulated in the refrigerant reservoirs 56 of the non-output-side refrigerant passage 54.

The refrigerant is supplied from the non-output-side refrigerant passage 54 to the rotor core cooling holes 35 via the refrigerant reservoirs 56. A sufficient amount of the refrigerant for the supply is accumulated in the refrigerant reservoirs 56. The plurality of rotor core cooling holes 35 are formed in the same size in the circumferential direction of the shaft 30. Thus, the refrigerant is uniformly supplied to the plurality of rotor core cooling holes 35 in the circumferential direction of the shaft 30. Accordingly, the refrigerant can cool the plurality of permanent magnets 32 without depending on an rpm of the rotary electric machine 1 or without unevenness in the circumferential direction of the shaft 30. In this manner, performance deterioration due to demagnetization of the permanent magnets 32 can be suppressed. In addition, each of the refrigerant reservoirs 56 communicates with two inner diameter-side flux barriers 36. Thus, the refrigerant is also continuously supplied from each of the refrigerant reservoirs 56 to corresponding two radially inner-side flux barriers without depending on the rpm of the rotary electric machine 1. In this manner, cooling of each of the permanent magnets 32 is promoted.

As illustrated in FIG. 1, the refrigerant is caused to flow from the rotor core cooling holes 35 and the radially inner-side flux barriers 36 to pass through the holes into which the permanent magnets 32 are inserted to the radially outer-side flux barriers 37 by the centrifugal force generated by the rotor 25 and a pressure of the pump 15. The refrigerant passes through the radially outer-side flux barriers 37 toward the output-side end plate 34. The refrigerant is discharged to an outside of the rotor 25 through the refrigerant discharge holes 55 formed in the output-side end plate 34. The refrigerant is subjected to the centrifugal force because of the rotation of the rotor 25. Thus, the refrigerant is evenly scattered from the refrigerant discharge holes 55 to the outer side in the radial direction of the shaft 30. The coil 21 is arranged on an outer periphery of the rotor 25 so as to surround the rotor 25. Thus, the refrigerant cools the coil 21, which generates heat, evenly in the circumferential direction of the rotor 25. With the above-mentioned functions of the refrigerant, temperature unevenness reduced, and performance deterioration is suppressed for the coil 21.

The refrigerant, which has been discharged from the rotor 25, is accumulated in a lower part of the rotary electric machine 1, passes through the refrigerant passage 19, and is discharged from the refrigerant discharge portion 18 to an outside of the rotary electric machine 1. A temperature of the refrigerant discharged from the refrigerant discharge portion 18 is increased in a process of cooling the permanent magnets 32. The refrigerant is cooled by the oil cooler 16. The oil cooler 16 is a device configured to cool the refrigerant through heat exchange, for example, between a gas and a liquid or between a liquid and a liquid. The cooled refrigerant is supplied to the refrigerant supply portion 17 through intermediation of the pump 15. In the above-mentioned manner, the refrigerant is circulated.

As described above, in the rotary electric machine 1 according to the first embodiment, the rotor 25 includes the rotor core 31, the permanent magnets 32 embedded in the rotor core 31, and the non-output-side end plate 33 configured to support the non-output side of the rotor core 31. The rotor core 31 has the rotor core cooling holes 35 through which the refrigerant for cooling the permanent magnets 32 flows in the axial direction of the shaft 30. The non-output-side refrigerant passage 54 communicating with the rotor core cooling holes 35 is formed in the non-output-side end plate 33. The non-output-side refrigerant passage 54 has the refrigerant reservoirs 56, each projecting to the outer side in the radial direction of the shaft 30.

The refrigerant in the non-output-side refrigerant passage 54 is subjected to the centrifugal force and the inertia force, which are generated by the rotation of the rotor 25. The refrigerant flows through the non-output-side refrigerant passage 54 in the circumferential direction of the shaft. 30 while being pressed against the wall face 70 located on the outer side in the radial direction of the shaft 30. The refrigerant reservoirs 56, each projecting to the outer side in the radial direction of the shaft 30, are formed on the wall face 70 of the non-output-side refrigerant passage 54. Thus, the refrigerant is likely to be accumulated in the refrigerant reservoirs 56. The refrigerant is continuously and stably supplied from the refrigerant reservoirs 56 to the rotor core cooling holes 35. Thus, unevenness does not occur in the amount of refrigerant supplied from the non-output-side refrigerant passage 54 to each of the plurality of rotor core cooling holes 35. Thus, the refrigerant can cool the permanent magnets 32 without temperature unevenness.

Thus, a rotary electric machine capable of evenly cooling permanent magnets of a rotor can be provided.

The rotor core cooling holes 35 communicate with the non-output-side refrigerant passage 54 through the refrigerant reservoirs 56. In this manner, the refrigerant accumulated in the refrigerant reservoirs 56 is efficiently supplied to the rotor core cooling holes 35.

The shaft center refrigerant passage 52, which is open on the non-output side of the shaft 30, is formed in the shaft 30 to extend from the non-output side in the axial direction of the shaft 30 so as not to completely pass therethrough. The shaft. 30 also has the shaft radial refrigerant passages 53. The shaft radial refrigerant passages 53 communicate with the shaft center refrigerant passage 52, and are formed to extend in the radial direction of the shaft 30 to communicate with the non-output-side refrigerant passage 54. With the arrangement described above, a pipe for supplying the refrigerant is not required to be drawn out to the rotor 25 to be rotated. As a result, the refrigerant can be supplied into the rotor 25 in a simple manner.

A flow passage sectional area of the shaft center refrigerant passage 52 is larger than a flow passage sectional area of each of the shaft radial refrigerant passages 53. With this, a sufficient amount of refrigerant can be supplied to each of the shaft radial refrigerant passages 53 from the shaft center refrigerant passage 52.

The non-output-side end plate 33 is held in contact with the non-output-side end face 31a of the rotor core 31 at the flange 33a to thereby form the non-output-side refrigerant passage 54. Thus, an intermediate member is not required to be provided between the rotor core 31 and the non-output-side end plate 33. Thus, a risk that the refrigerant, which is subjected to the centrifugal force generated by the rotation of the rotor 25, may leak out from a gap between an intermediate member and the rotor core 31 or a gap between an intermediate member and the non-output-side end plate 33, can be reduced.

A stress-relaxing hole is formed in the rotor core 31 to extend in the axial direction of the shaft 30 in some cases so as to relax a stress of the rotor core 31. When the stress-relaxing hole is formed on the inner side in the radial direction of the shaft 30 with respect to the rotor core cooling holes 35, there is a possibility that the refrigerant may flow into the stress-relaxing hole. However, the centrifugal force acts on the refrigerant in the non-output-side refrigerant passage 54. Thus, most of the refrigerant is accumulated in the refrigerant reservoirs 56 without being supplied to the stress-relaxing hole. Thus, another member serving as a partition wall for suppressing flow of the refrigerant into the stress-relaxing hole is not required to be arranged in the non-output-side refrigerant passage 54.

Second Embodiment

Next, a rotary electric machine according to a second embodiment is described with reference to FIG. 4. In the rotary electric machine according to the second embodiment, refrigerant guide portions are formed so as to be adjacent to the refrigerant reservoirs in the circumferential direction of the shaft, respectively.

Figure 4:
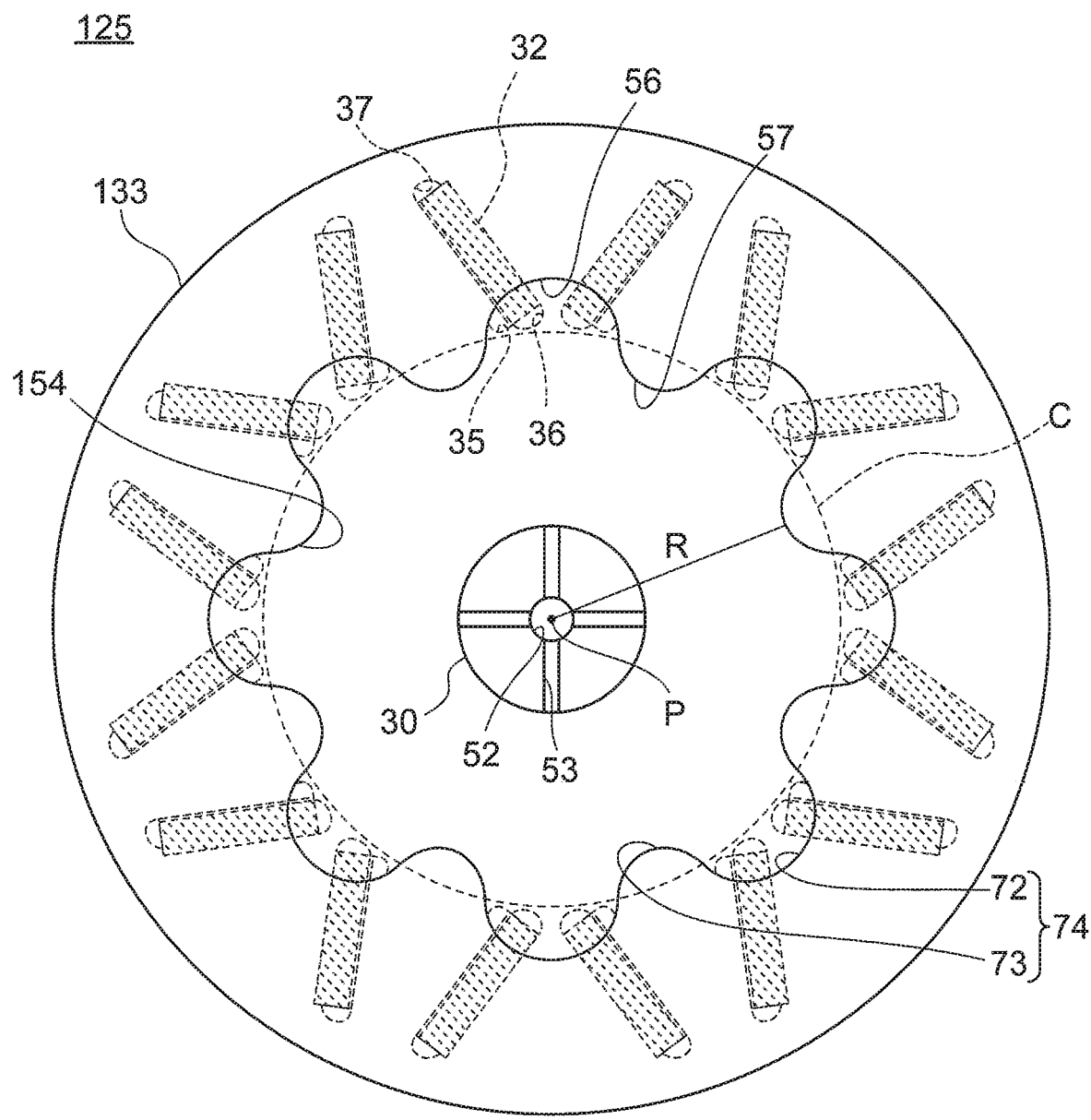
FIG. 4 is a view of the rotor when viewed from a plane containing a non-output-side refrigerant passage in a rotary electric machine according to a second embodiment.

FIG. 4 is a view of the rotor when viewed from a plane containing a non-output-side refrigerant passage in the rotary electric machine according to the second embodiment. FIG. 4 corresponds to FIG. 2 in the first embodiment. FIG. 4 corresponds to an illustration of the rotor when viewed from the line II-II in FIG. 1.

In the second embodiment, a rotor 125 includes the rotor core 31, the plurality of permanent magnets 32, a non-output-side end plate 133, and the output-side end plate 34. A non-output-side refrigerant passage 154 is formed in the non-output-side end plate 133 so as to be defined between the non-output-side end plate 133 and the non-output-side end face 31a of the rotor core 31. The non-output-side refrigerant passage 154 has refrigerant guide portions 57 formed so as to be adjacent to the refrigerant reservoirs 56 in the circumferential direction of the shaft 30. Each of the refrigerant guide portions 57 is a semi-circular portion of the non-output-side refrigerant passage 154, which projects to the inner side in the radial direction of the shaft 30. The rotor core cooling holes 35 communicate with the non-output-side refrigerant passage 154 through the refrigerant reservoirs 56. The refrigerant guide portions 57 are formed on the inner side in the radial direction of the shaft 30 with respect to the rotor core cooling holes 35.

The non-output-side refrigerant passage 154 has a wall face 74 on the outer side in the radial direction of the shaft 30. The wall face 74 has the projecting-portion wall faces and recessed-portion wall face 73, which are formed alternately along the circumferential direction of the shaft 30. Each of the refrigerant guide portions 57 is formed by the recessed-portion wall face 73.

The refrigerant supplied to the non-output-side refrigerant passage 154 is subjected to the centrifugal force and the inertia force, which are generated by the rotation of the rotor 125. The refrigerant flows through the non-output-side refrigerant passage 154 in the circumferential direction of the shaft 30 while being pressed to the outer side in the radial direction of the shaft 30. Specifically, the refrigerant flows along the wall face 74. The refrigerant reservoirs 56 and the refrigerant guide portions 57 are arranged along the wall face 74. The refrigerant guide portions 57 are arranged in the circumferential direction of the shaft 30 so as to be adjacent to the refrigerant reservoirs 56, respectively. Thus, the refrigerant flowing to the refrigerant guide portions 57 easily flows into the refrigerant reservoirs 56. The refrigerant is trapped in the refrigerant reservoirs 56. The refrigerant reservoirs 56 are constantly filled with the refrigerant. The refrigerant is continuously and stably supplied from the refrigerant reservoirs 56 evenly to the plurality of rotor core cooling holes 35 communicating with the refrigerant reservoirs 56. The refrigerant cools the permanent magnets 32 while flowing from the rotor core cooling holes 35 to the radially outer-side flux barriers 37. As a result, the temperature unevenness of the permanent magnets 32 in the circumferential direction of the shaft 30 is reduced, and the performance deterioration due to the demagnetization of the permanent magnets 32 is suppressed.

As described above, the non-output-side refrigerant passage 154 has the refrigerant guide portions 57, each projecting to the inner side in the radial direction of the shaft 30 with respect to the rotor core cooling holes 35, which are formed in the circumferential direction of the shaft 30 so as to be adjacent to a corresponding one of the refrigerant reservoirs 56. With the arrangement described above, the refrigerant flowing to the refrigerant guide portions 57 easily flows into the refrigerant reservoirs 56. The refrigerant is trapped in the refrigerant reservoirs 56, and is continuously and stably supplied to the rotor core cooling holes 35. Thus, the refrigerant is evenly supplied to each of the plurality of rotor core cooling holes 35. In this manner, the temperature unevenness of the permanent magnets 32 in the circumferential direction of the shaft 30 is reduced, and the performance deterioration due to the demagnetization of the permanent magnets 32 is suppressed.

Third Embodiment

Next, a rotary electric machine according to a third embodiment is described with reference to FIG. 5 and FIG. 6. In the rotary electric machine according to the third embodiment, non-output-side jet passages communicating with a non-output-side refrigerant passage are formed on an outer periphery side of the non-output-side refrigerant passage.

Figure 5:
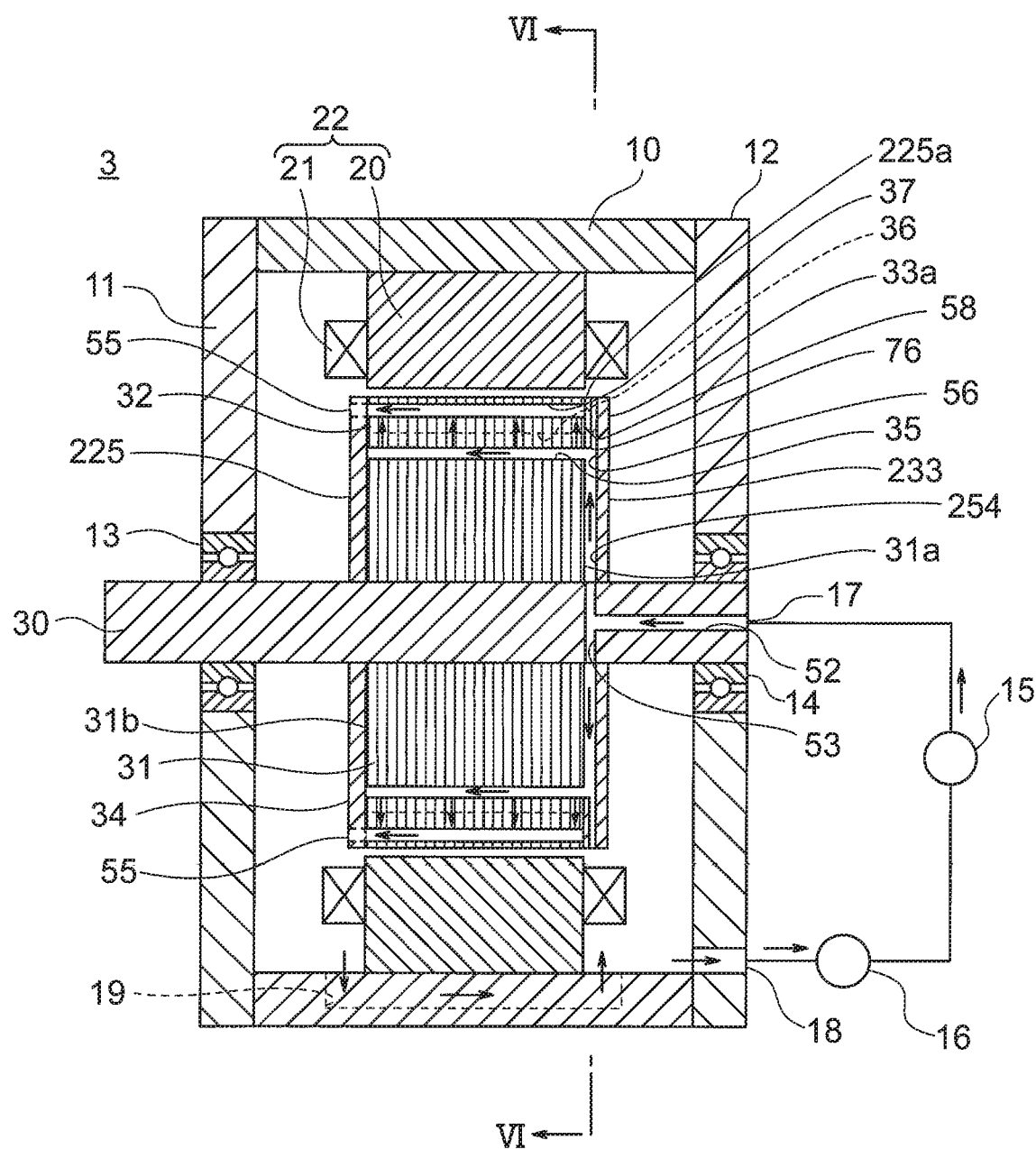
FIG. 5 is a schematic sectional view of a rotary electric machine according to a third embodiment, which is taken along the axial direction of the shaft.

FIG. 5 is a schematic sectional view of the rotary electric machine according to the third embodiment, which is taken along the axial direction of the shaft. In a rotary electric machine 3 according to the third embodiment, a rotor 225 includes the rotor core 31, the permanent magnets 32, a non-output-side end plate 233, and the output-side end plate 34. A non-output-side refrigerant passage 254 is formed in the non-output-side end plate 233 so as to be defined between the non-output-side end plate 233 and the non-output-side end face 31a of the rotor core 31. Non-output-side jet passages 58 are formed in the non-output-side end plate 233 so as to communicate with the non-output-side refrigerant passage 254. Each of the non-output-side jet passages 58 is a hole passing from the non-output-side refrigerant passage 254 to a rotor outer peripheral face 225a being an outer peripheral face of the rotor 225. Each of the non-output-side jet passages 58 corresponds to a one end-side jet passage.

Figure 6:
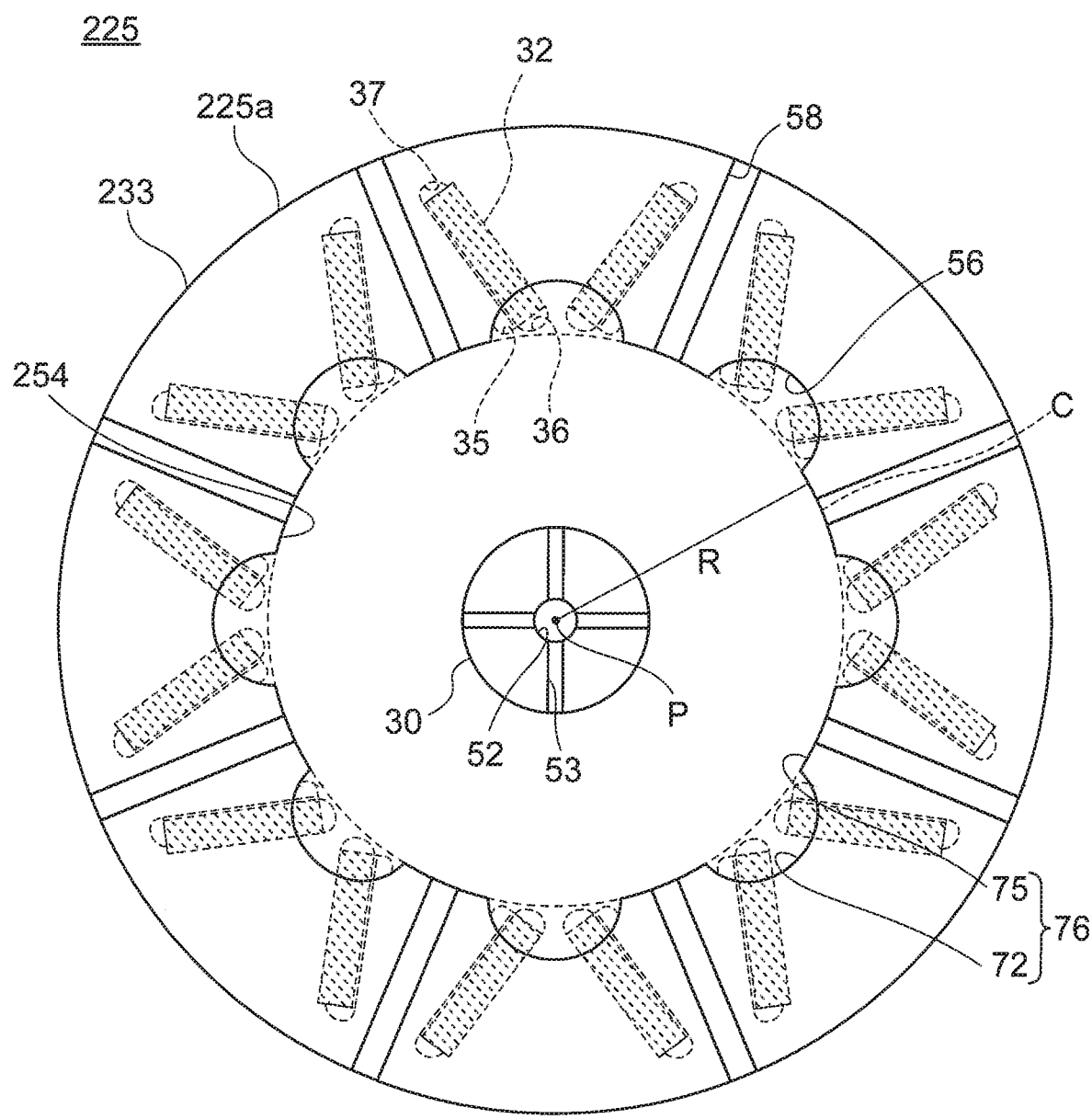
FIG. 6 is a view of a rotor when viewed from the line VI-VI in FIG. 5.

FIG. 6 is a view of the rotor when viewed from the line VI-VI in FIG. 5. The non-output-side refrigerant passage 254 has a wall face 76 on the outer side in the radial direction of the shaft 30. The wall face 76 has arc wall faces 75 and the projecting portion wall faces 72, which are formed alternately along the circumferential direction of the shaft 30. Each of the arc wall faces 75 is an arc face formed on a circle C, which has a length R as a radius and the center axis P of the shaft 30 as a center. Each of the non-output-side jet passages 58 passes from the arc wall face 75 as a starting point, specifically, from the non output side refrigerant passage 254 to the rotor outer peripheral face 225a. A cross section of each of the non-output-side jet passages 58 is circular. The cross section of each of the non-output-side jet passages 58 may be ellipsoidal or rectangular. The non output side jet, passages 58 are opposed to a non-output side portion of the coil 21.

The refrigerant supplied to the non-output-side refrigerant passage 254 is subjected to the centrifugal force and the inertia force, which are generated by the rotation of the rotor 225. The refrigerant flows through the non-output-side refrigerant passage 254 in the circumferential direction of the shaft 30 while being pressed to the outer side in the radial direction of the shaft 30. Specifically, the refrigerant flows along the wall face 76. Part of the refrigerant is trapped in the refrigerant reservoirs 56. The refrigerant trapped in the refrigerant reservoirs 56 is evenly supplied to the plurality of rotor core cooling holes 35. The refrigerant cools the permanent magnets 32 while flowing from the rotor core cooling holes 35 to the radially outer-side flux barriers 37. The refrigerant passes through the radially outer-side flux barriers 37 to be discharged from the refrigerant discharge holes 55 of the output-side end plate 34.

Meanwhile, part of the refrigerant having reached the wall face 76 is not trapped in the refrigerant reservoirs 56, and passes through the non-output-side jet passages 58 to be guided to an outside of the rotor 225. On an outer side of the rotor 225, the coil 21 is arranged so as to surround the rotor 225. A centrifugal force generated by rotation of the rotor 225 acts on the refrigerant discharged from the non-output-side jet passages 58. Thus, the refrigerant is scattered in a droplet state. Further, the non-output-side jet passages 58 are opposed to the non-output-side portion of the coil 21. Thus, the refrigerant can cool the coil 21 with high efficiency on the non-output side. Specifically, the refrigerant having passed through the non-output-side jet passages 53 can suppress a temperature rise of the coil 21 generating heat.

Meanwhile, the refrigerant discharged from the refrigerant discharge holes 55 of the output-side end plate 34 is subjected to the centrifugal force generated by the rotation of the rotor 225 to be scattered in a droplet form. The refrigerant discharged from the refrigerant discharge holes 55 cools the coil 21 provided around the rotor 225 on the output side evenly in the circumferential direction. With the configuration described above, both of the output-side end and the non-output-side end of the coil 21 are cooled with the refrigerant scattered from the output side of the rotor 225 and the refrigerant scattered from the non-output side thereof, respectively. Thus, the temperature rise of the coil 21 is further suppressed in comparison to the case in which the configuration of the first embodiment described above is adopted. The coil 21 is formed of a member having a high thermal conductivity such as copper in many cases. Thus, when both ends of the coil 21 are cooled with use of the scattered refrigerant as in the third embodiment, heat is actively transferred inside the coil 21. Thus, the refrigerant can efficiently decrease the temperature not only at both ends of the coil 21 but also in the center of the coil 21. A larger current can be applied to the coil 21 along with the temperature decrease of the coil 21. Thus, performance improvement of the rotary electric machine can be achieved.

As described above, the non-output-side jet passages 58, which communicate with the non-output-side refrigerant passage 254 and are each open on the outer side in the radial direction of the shaft 30, are formed in the non-output-side end plate 233. Thus, the coil 21 is cooled with high efficiency on the non-output side. As a result, the performance of the rotary electric machine can be further improved.

Fourth Embodiment

Next, a rotary electric machine according to a fourth embodiment is described with reference to FIG. 7 and FIG. 8. In the rotary electric machine according to the fourth embodiment, output-side jet passages are formed on an outer periphery side of the output-side refrigerant passage.

Figure 7:
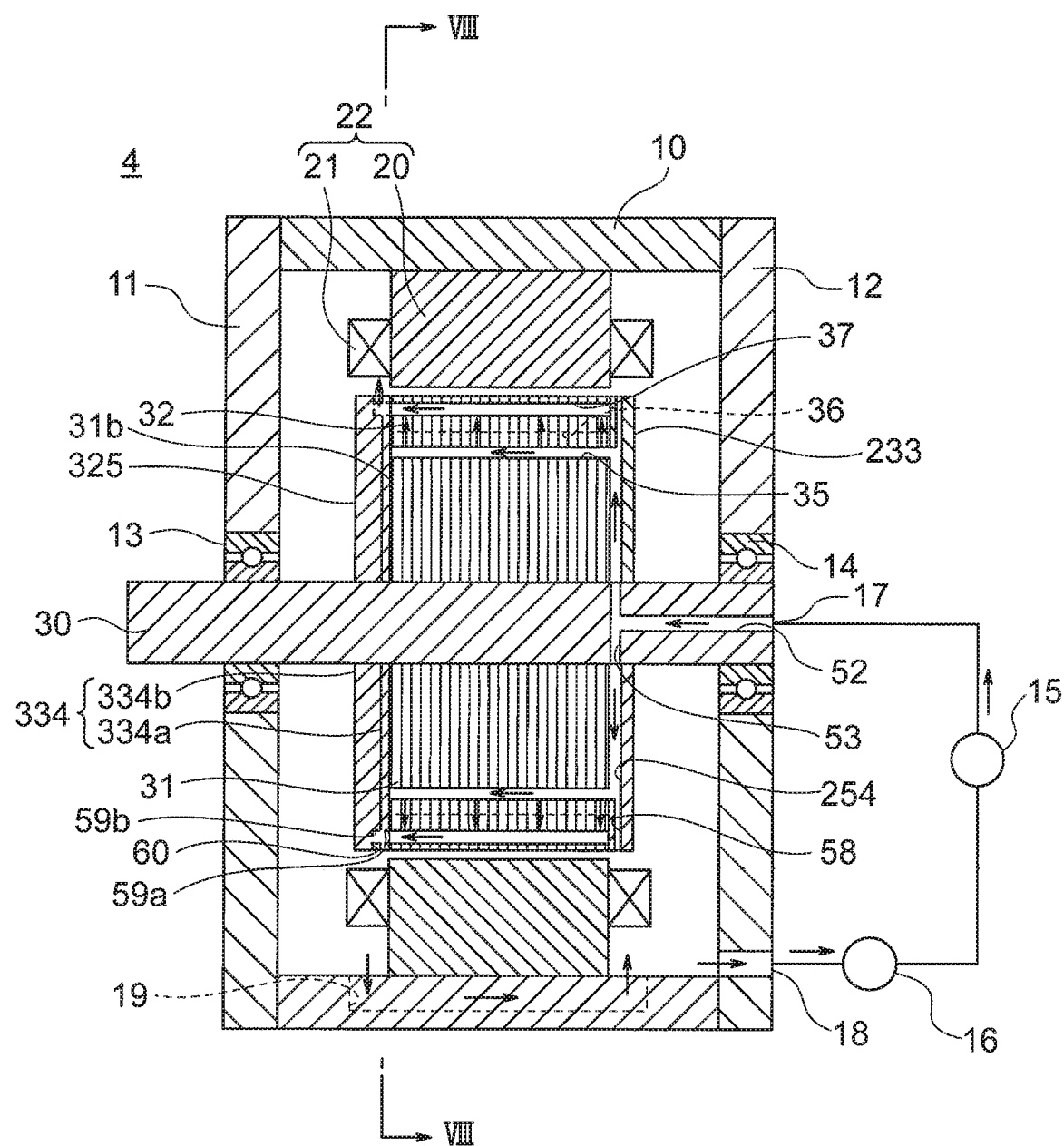
FIG. 7 is a schematic sectional view of a rotary electric machine according to a fourth embodiment, which is taken along the axial direction of the shaft.

FIG. 7 is a schematic sectional view of the rotary electric machine according to the fourth embodiment, which is taken along the axial direction of the shaft. In a rotary electric machine 4 according to the fourth embodiment, a rotor 325 includes the rotor core 31, the permanent magnets 32, the non-output-side end plate 233, and an output-side end plate 334. The output-side end plate 334 includes an inner output-side end plate 334a and an outer outer-side end plate 334b. The inner output-side end plate 334a is provided so as to be held in contact with the output-side end face 31b of the rotor core 31. The outer output-side end plate 334b is provided on a side opposite to the output-side end face 31b of the rotor core 31 so as to be held in contact with the inner output-side end plate 334a.

The inner output-side end plate 334a has inner output-side discharge passages 59a. The inner output-side discharge passages 59a are flow passages communicating with the radially outer-side flux barriers 37. The outer output-side end plate 334b has an outer output-side discharge passage 59b. The outer output-side discharge passage 59b is a flow passage communicating with the inner output-side discharge passages 59a. Output-side jet passages 60 are formed in a face of the outer output-side end plate 334b, which is located on the outer side in the radial direction of the shaft 30. The output-side jet passages 60 are open on the outer output-side end plate 334b, and, for example, are slits cut in the circumferential direction of the shaft 30. The output-side jet passages 60 are opposed to the output-side portion of the coil 21. The output-side jet passages 60 communicate with the outer output-side discharge passage 59b. The inner output-side discharge passages 59a and the outer output-side discharge passage 59b correspond to discharge holes. The output-side jet passages 60 correspond to another end-side let passages.

Figure 8:
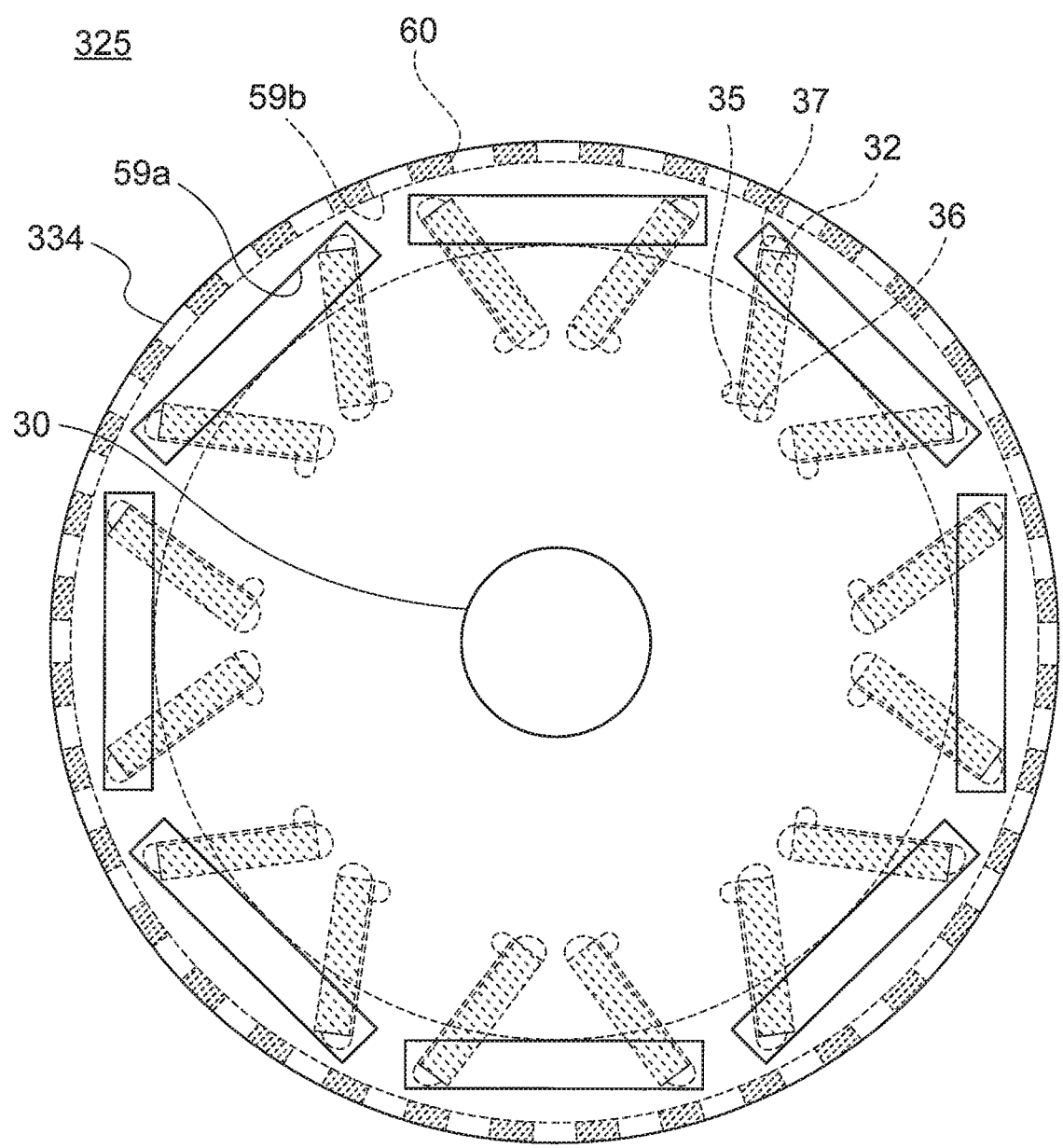
FIG. 8 is a view of a rotor when viewed from the line VIII-VIII in FIG. 7.
Figure 9:
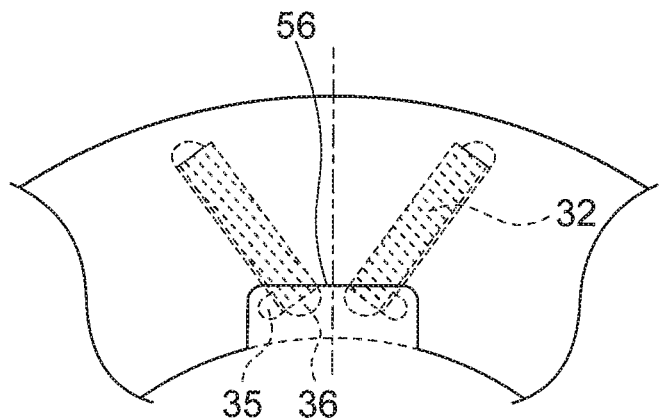
FIG. 9 is a view of a modification example of the refrigerant reservoir.
Figure 10:
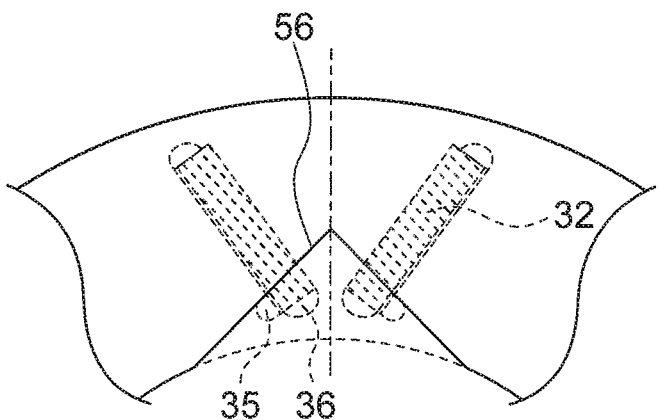
FIG. 10 is a view of a modification example of the refrigerant reservoir.
Figure 11:
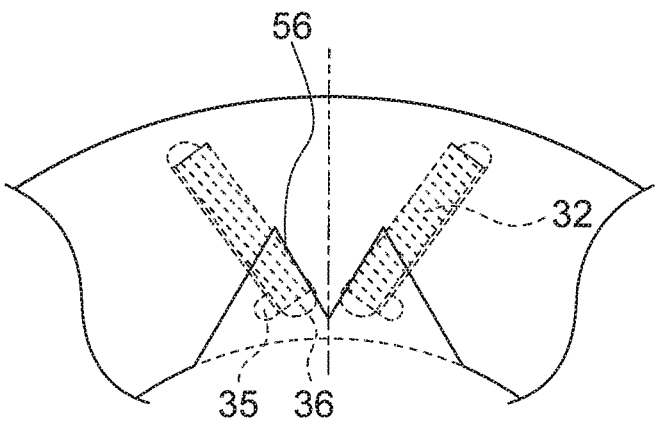
FIG. 11 is a view of a modification example of the refrigerant reservoir.
Figure 12:
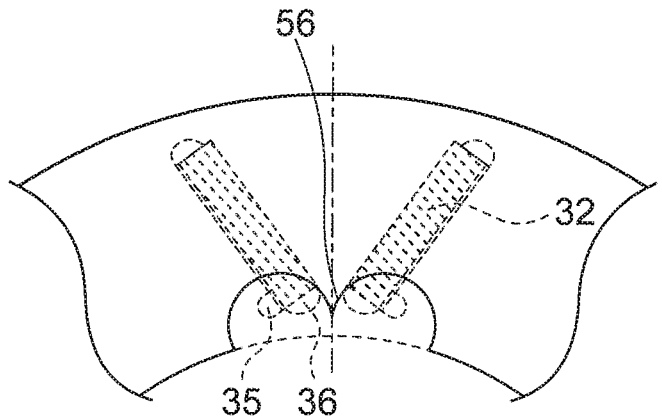
FIG. 12 is a view of a modification example of the refrigerant reservoir.
Figure 13:
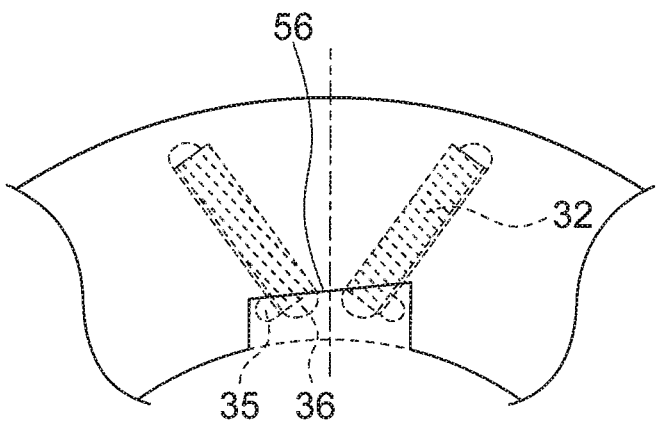
FIG. 13 is a view of a modification example of the refrigerant reservoir.
Figure 14:
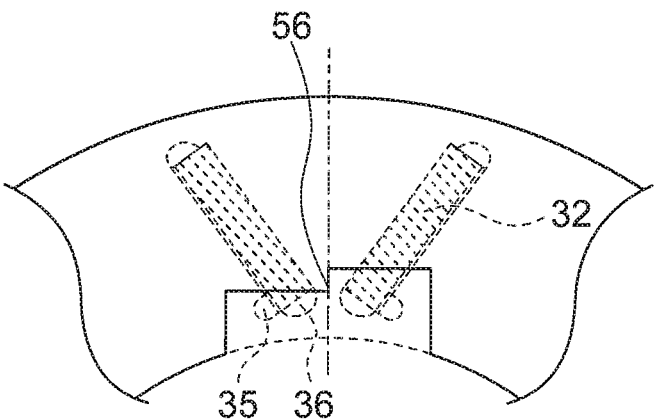
FIG. 14 is a view of a modification example of the refrigerant reservoir.
Figure 15:
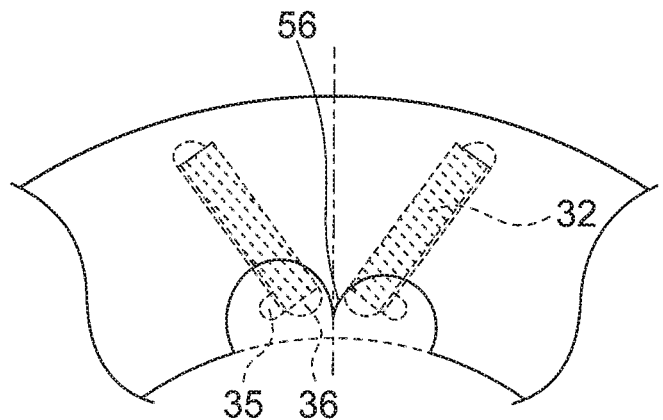
FIG. 15 is a view of a modification example of the refrigerant reservoir.
Figure 16:
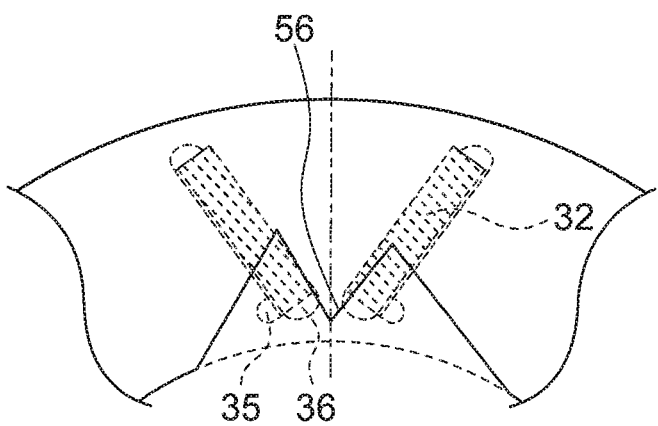
FIG. 16 is a view of a modification example of the refrigerant reservoir.

FIG. 8 is a view of the rotor when viewed from the line VIII-VIII in FIG. 7. Each of the inner output-side discharge passages 59a communicates with two radially outer-side flux barriers 37 for the permanent magnets 32 adjacent to each other. A cross section of each of the inner output-side discharge passages 59a is, for example, rectangular. The outer output-side discharge passage 59b is a cavity formed in the outer output-side end plate 334b over the entire circumference.

The refrigerant cools the permanent magnets 32, and reaches the radially outer-side flux barriers 37. The refrigerant passes through the inner output-side discharge passages 59a and the outer output-side discharge passage 59b. The refrigerant is discharged from the output-side jet passages 60 to an outside of the rotor 325. The coil 21 is arranged around the rotor 325. Thus, the refrigerant scattered from the output-side jet passages 60 are evenly sprayed onto the coil 21 generating heat.

With the formation of the output-side jet passages 60, the refrigerant passing through the inner output-side discharge passages 59a and the outer output-side discharge passage 59h is reliably scattered to the outer side in the radial direction of the shaft 30 from the outer-side jet passages 60. Thus, leakage of the refrigerant in the axial direction of the shaft 30 is suppressed.

The refrigerant discharged from the output-side jet passages 60 is subjected to a centrifugal force generated by rotation of the rotor 325. The refrigerant is evenly scattered in a droplet form. The coil 21 is arranged around the output-side jet passages 60 so as to surround the rotor 325. The output-side jet passages 60 are arranged so as to be opposed to the output side of the coil 21. Thus, the refrigerant scattered from the output-side jet passages 60 is evenly and efficiently spayed onto the coil 21 generating heat. Thus, the coil 21 is more intensively cooled than in a case in which the refrigerant discharge holes 55 are formed in the first embodiment. A larger current can be applied to the coil 21 along with a temperature decrease of the coil 21. Thus, the performance improvement of the rotary electric machine can be achieved.

Further, the non-output-side jet passages 58 are formed in the non-output-side end plate 233. Thus, the non-output-side portion of the coil 21 is cooled with the refrigerant scattered from the non output-side jet passages 58. With a combination of the non-output-side jet passages 58 and the output-side jet passages 60, the refrigerant scattered from the rotor 325 can cool both of the non-output-side end and the output-side end of the coil 21. The coil 21 is formed of a member having a high thermal conductivity such as copper in many cases. Thus, when both ends of the coil 21 are cooled with use of the scattered refrigerant as in the fourth embodiment, heat actively transferred inside the coil 21. Thus, the refrigerant can efficiently decrease the temperature not only at both ends of the coil 21 but also in the center of the coil 21. A larger current can be applied to the coil 21 along with the temperature decrease of the coil 21. Thus, performance improvement of the rotary electric machine can be achieved.

Each of the output-side jet passages 60 is formed in a slit shape. With the slit shape, a pressure loss of the refrigerant supplied from the inner output-side discharge passages 59a and the outer output-side discharge passage 59b is decreased. Thus, motive power of the pump 15 can be reduced.

As described above, the rotor 325 further includes the output-side end plate 334 configured to support the output side of the rotor core 31. The output-side end plate 334 has the inner output-side discharge passages 59 and the outer output-side discharge passage 59b, through which the refrigerant having flowed through the rotor core cooling holes 35 is guided inside the output-side end plate 334. Further, the output-side end plate 334 has the output-side jet passages 60, which communicate with the outer output-side discharge passage 59b and are open on the outer side in the radial direction of the shaft 30. Thus, the refrigerant scattered from the output-side jet passages 60 are evenly spayed to the coil 21 generating heat. The coil 21 is uniformly cooled in the circumferential direction of the rotor 325 without temperature unevenness. As a result, a larger current can be applied to the coil 21 in comparison to that in the related art. Thus, the performance improvement of the rotary electric machine can be achieved.

In the first to fourth embodiments, for example, as illustrated in FIG. 1, the non-output-side refrigerant passage 54 is formed by combining the shaft 30 and the non-output-side end plate 33. In this case, a width of the non-output-side refrigerant 54 in the axial direction of the shaft 30 is set larger than a width of each of the shaft radial refrigerant passages 53 in the axial direction of the shaft 30. With the widths described above, positional shifts of the non-output-side refrigerant passage 54 and the shaft radial refrigerant passages 53 do not occur. Thus, the refrigerant is reliably guided from the shaft radial refrigerant passages 3 to the non-output-side refrigerant passage 54. Further, the refrigerant can be supplied at a stable flow rate without narrowing the flow passage width of each of the shaft radial refrigerant passages 53.

Figure 17:
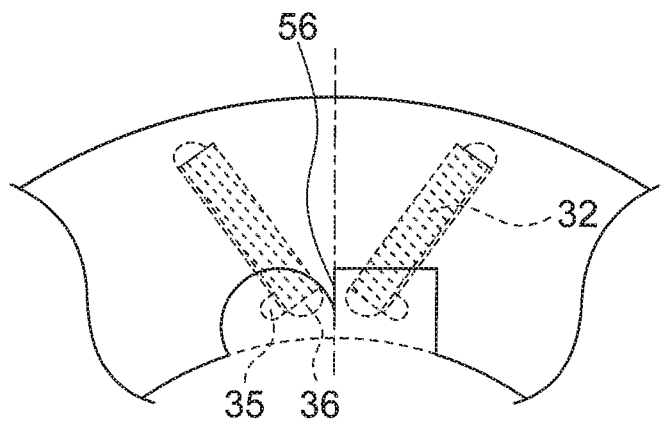
FIG. 17 is a view of a modification example of the refrigerant reservoir.
Figure 18:
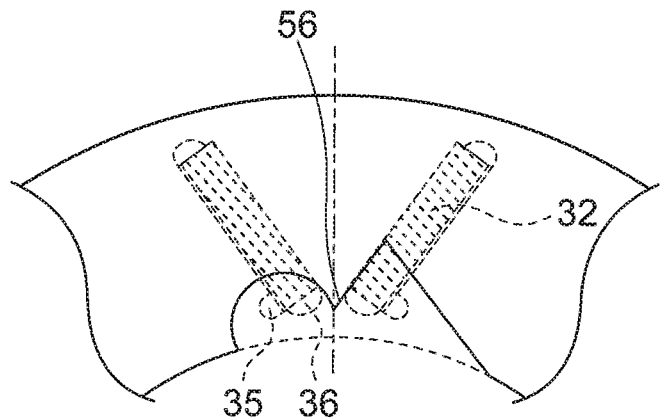
FIG. 18 is a view of a modification example of the refrigerant reservoir.
Figure 19:
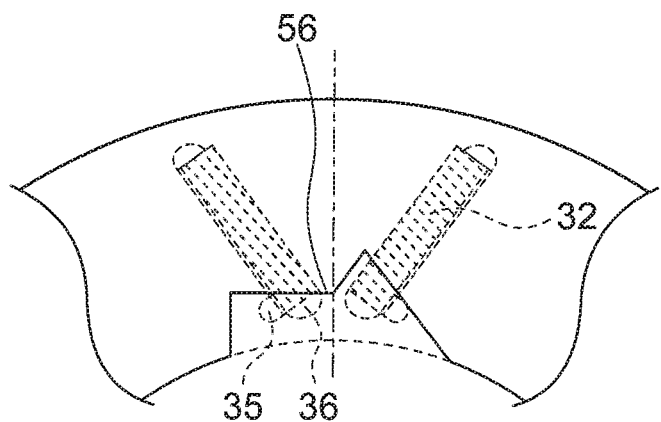
FIG. 19 is a view of a modification example of the refrigerant reservoir.

In the first to fourth embodiments, each of the refrigerant reservoirs 56 has the arc shape. However, the shape of each of the refrigerant reservoirs 56 is not limited thereto. Each of the refrigerant reservoirs 56 may have any shape as long as the refrigerant reservoir 56 is a space projecting from the arc wall face 71 or the arc wall face 75 to the outer side in the radial direction of the shaft 30 and communicates with a corresponding one of the rotor core cooling holes 35. FIG. 9 to FIG. 19 are views, each for illustrating a modification example of the refrigerant reservoir 56. The shape of the refrigerant reservoir 56 may be, as illustrated in FIG. 9 to FIG. 12, a rectangular shape, a triangular shape, a combination of two connected triangular shapes, or a combination of two connected arcs, each being symmetric with respect to an axis of symmetry of two permanent magnets 32 arranged in a V-shape. Further, the shape of the refrigerant reservoir 56 may also be, as illustrated in FIG. 13 to FIG. 16, a rectangular shape, a combination of connected rectangles, or a combination of two connected arcs, or a combination of two connected triangular shapes, each being asymmetric with respect to the axis of symmetry of two permanent magnets 32 arranged in a V-shape. Further, the shape of the refrigerant reservoir 56 may also be, as illustrated in FIG. 17 to FIG. 19, a combination of an arc and a rectangle, which are connected to each other, a combination of an arc and a triangle, which are connected to each other, or a combination of rectangle and a triangle, which are connected to each other. The shape of the refrigerant reservoir 56 may be a combination of various polygons and arcs other than those illustrated in FIG. 9 to FIG. 19. The first to fourth embodiment, of the present invention have been described with reference to the accompanying drawings. However, the accompanying drawings illustrate merely an example, and the present invention may encompass various embodiments.

REFERENCE SIGNS LIST 1, 3, 4 rotary electric machine, 25, 125, 225, 325 rotor, 30 shaft, 31 rotor core, 32 permanent magnet, 33, 133, 233 non-output-side end plate (one end-side end plate), 34, 334 output-side end plate (another end-side end plate), 35 rotor core cooling hole (rotor refrigerant passage), 52 shaft center refrigerant passage, 53 shaft radial refrigerant passage, 54, 154, 254 non-output-side refrigerant passage (end plate refrigerant passage), 56 refrigerant reservoir, 57 refrigerant guide portion, 58 non-output-side jet passage (one end-side jet passage), 59a inner output-side discharge passage (discharge hole), 59b outer output-side discharge passage (discharge hole), 60 output-side jet passage (another end-side jet passage)

The invention claimed is:
1. A rotary electric machine, comprising a rotor configured to be rotated with a shaft serving as a rotary shaft,
wherein the rotor includes:
  a rotor core;
  a plurality of permanent magnets to be embedded in the rotor core; and
  a one end-side end plate configured to support one end side of the rotor core,
an another end-side end plate configured to support another end side of the rotor core,
  wherein the shaft has a shaft radial refrigerant passage passing in a radial direction of the shaft,
wherein the rotor core has a plurality of rotor refrigerant passages through which refrigerant for cooling the plurality of permanent magnets flows in an axial direction of the shaft,
wherein the rotor core has radially inner-side flux barriers formed on an inner side of the permanent magnets in the radial direction of the shaft and radially outer-side flux barriers formed on an outer side of the permanent magnets in the radial direction of the shaft, each of the radially inner-side flux barriers and the radially outer-side flux barriers is a hole passing through the rotor core in the axial direction of the shaft,
wherein the one end-side end plate has an end plate refrigerant passage, which is configured to bring the plurality of rotor refrigerant passages and the shaft radial refrigerant passage into communication with each other, and is formed over an entire circumference of the shaft, wherein the end plate refrigerant passage has a plurality of refrigerant reservoirs, each projecting to an outer side in the radial direction of the shaft, wherein each of the plurality of refrigerant reservoirs is arranged at a position for cooling one corresponding pair of permanent magnets of the plurality of permanent magnets and each of the plurality of refrigerant reservoirs communicates with two of the radially inner-side flux barriers, wherein the radially inner-side flux barriers communicate with the radially outer-side flux barriers through holes in which the permanent magnets are inserted, and wherein the another end-side end plate includes refrigerant discharge holes which communicate with the radially outer-side flux barriers and discharge the refrigerant, and the refrigerant is distributed from the rotor refrigerant passages and the radially inner-side flux barriers to the radially outer-side flux barriers through the holes in which the permanent magnets are inserted, and is discharged from the refrigerant discharge holes to the outside of the rotor.

2. The rotary electric machine according to claim 1, wherein the rotor refrigerant passages communicate with the end plate refrigerant passage through the refrigerant reservoirs.

3. The rotary electric machine according to claim 1, wherein the end plate refrigerant passage has refrigerant guide portions, each being adjacent to a corresponding one of the refrigerant reservoirs in a circumferential direction of the shaft, which project to an inner side in the radial direction of the shaft with respect to the rotor refrigerant passages.

4. The rotary electric machine according to claim 1, wherein the one end-side end plate has one end-side jet passages, which communicate with the end plate refrigerant passages, and which are open on the outer side in the radial direction of the shaft.

5. The rotary electric machine according to claim 1,
wherein the another end-side end plate has:
discharge holes through which the refrigerant having flowed through the rotor refrigerant passages is guided into the another end-side end plate; and
another end-side jet passages, which communicate with the discharge holes, and are open on an outer side in the radial direction of the shaft.

6. The rotary electric machine according to claim 1,
wherein the shaft has a shaft center refrigerant passage, which is open on the one end side of the shaft, and which is formed in the shaft to extend from the one end side in the axial direction of the shaft so as not to pass completely through the shaft, and
wherein the shaft center refrigerant passage communicates with the shaft radial refrigerant passage.

7. The rotary electric machine according to claim 6, wherein a flow passage sectional area of the shaft center refrigerant passage is larger than a flow passage sectional area of each of the shaft radial refrigerant passages.

* * * * *